United States Patent [19]

Marshall

[11] 4,408,488

[45] Oct. 11, 1983

[54] GENERALIZED DRIFTING OCEANOGRAPHIC SENSOR

[76] Inventor: Samuel W. Marshall, Box 526M, Torregano Rd., Slidell, La. 70458

[21] Appl. No.: 365,845

[22] Filed: Apr. 5, 1982

[51] Int. Cl.³ .......................................... G01D 11/24
[52] U.S. Cl. ..................................... 73/170 A; 441/32
[58] Field of Search ................ 73/170 A; 441/32, 33, 441/21, 29, 30

[56] References Cited

U.S. PATENT DOCUMENTS

| | | | |
|---|---|---|---|
| 3,230,500 | 1/1966 | Dunn | 73/170 |
| 3,512,408 | 5/1970 | Douglass, Jr. | 73/170 |
| 3,590,406 | 7/1971 | Lockwood | 73/170 A |
| 3,738,164 | 6/1973 | Sanford et al. | 73/170 |
| 3,837,224 | 9/1974 | Ream, Jr. | 73/170 |
| 3,910,111 | 10/1975 | Mott et al. | 73/170 |
| 3,983,750 | 10/1976 | Kirkland | 73/170 A |
| 4,258,568 | 3/1981 | Boetes et al. | 73/170 A |

*Primary Examiner*—Donald O. Woodiel
*Attorney, Agent, or Firm*—R. F. Beers; F. I. Gray

[57] ABSTRACT

A generalized drifting oceanographic sensor (GDOS) is cast adrift in the oceanographic environment along a pre-programmed depth schedule. A variable buoyancy housing has one or more external oceanographic sensors and an external acoustic telemetry transducer. Signal processing electronics are contained internal to the housing together with an electric power pack and multiplexer. The data from the sensors are processed, multiplexed and transmitted by the acoustic transducer. Additional data are obtained from azimuthal correlation by two or more fixed acoustic receivers.

2 Claims, 1 Drawing Figure

GENERALIZED DRIFTING OCEANOGRAPHIC SENSOR

The invention described herein may be manufactured and used by and for the Government of the United States of American for Governmental purposes without the payment of any royalties thereon or therefor.

BACKGROUND OF THE INVENTION

1. Field of the Invention

The present invention relates to a system for oceanographic sampling, and more particularly to a freely drifting sensor set with signal processor, power pack and acoustic telemetry transducer.

2. Description of the Prior Art

Oceanographic measurements are generally obtained by seagoing vessels which stream instruments overboard or which launch expendable or retrievable instrumentation packages. Expendable instrumentation packages are also launched from aircraft. In either situation station keeping is necessary to retrieve the data. From a practical point of view there are areas which are inaccessible for such oceanographic measurements. Therefore, an oceanographic measurement system is desired which can provide long term realtime data without the requirement of station keeping.

SUMMARY OF THE INVENTION

Accordingly, the present invention provides a generalized drifting oceanographic sensor (GDOS) which is cast adrift in the oceanographic environment along a pre-programmed depth schedule. A variable buoyancy housing has external oceanographic sensors and an external acoustic telemetry transducer. Signal processing electronics are contained internal to the housing together with an electric power pack and multiplexer. The data from the sensors is processed, multiplexed and transmitted by the acoustic transducer. Additional data is obtained from azimuthal correlation by two or more fixed acoustic receivers.

Thus, one of the objects of the present invention is to provide a generalized drifting oceanographic sensor for providing realtime oceanographic measurements to remote sites.

Other objects, advantages and novel features will be apparent from the following detailed description when read in conjunction with the appended claims and attached drawing.

BRIEF DESCRIPTION OF THE DRAWING

The FIGURE is a block diagram of a generalized drifting oceanographic sensor according to the present invention.

DESCRIPTION OF THE PREFERRED EMBODIMENT

Figure 1:
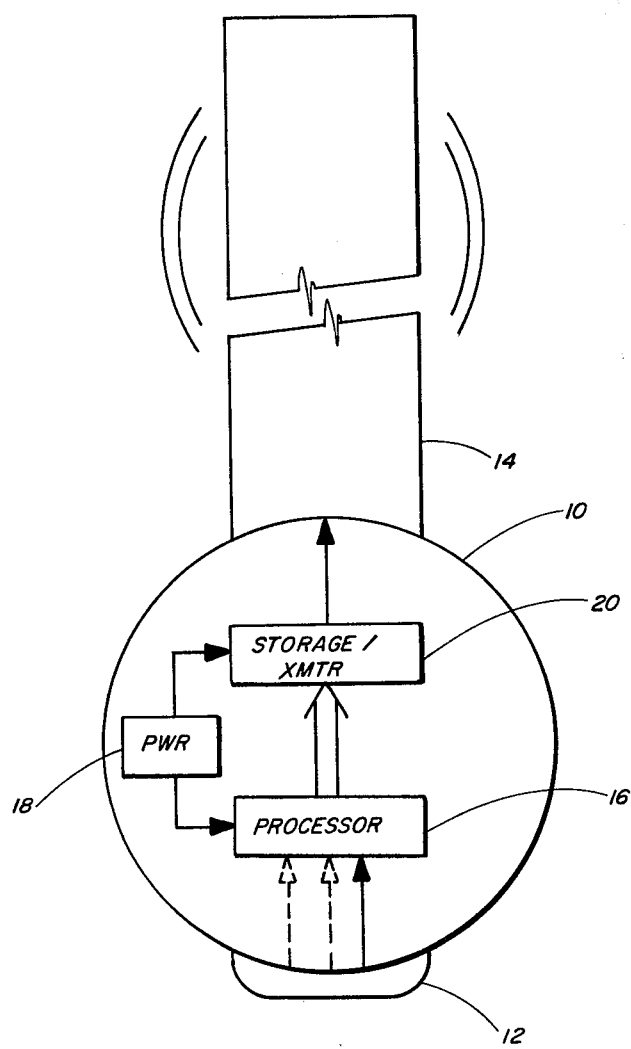

Referring now the FIGURE, a variable buoyancy housing 10, such as is known in the art, has one or more oceanographic sensors 12 mounted externally by any suitable means. Also mounted externally to the housing 10 is an acoustic telemetry transducer 14. The data from the oceanographic sensors 12, which may include acoustical and optical sensors as well as more conventional sensors, is input to a signal processing/multiplexer electronics package 16 mounted within the housing 10. Electrical power for the GDOS is provided by a self-contained power pack 18, such as a battery with converters and inverters as required, mounted within the housing 10. The signal processing/multiplexer electronics package 16 preprocesses and combines the data from the oceanographic sensor(s) 12 for transmission by the acoustic telemetry transducer 14. A storage/transmitter device 20 stores the data from the electronics package 16 and transmits the data in short telemetry transmission bursts. Existing acoustic sources are readily modified by appropriate modulation techniques to provide the necessary acoustic telemetry system indicated by the storage/transmitter device 20 and the acoustic transducer 14.

Oceanographic parameters which may be readily measured by the drifting oceanographic sensor system including temperature, salinity, sound speed, pressure, depth, sea surface roughness (acoustically), ocean turbulence/internal wave spectra, surface wind stress and current, acoustic ambient noise, and biota. Since the system is in a Lagrangian reference frame, it provides a very sensitive way to measure the desired parameters, i.e., extremely small perturbations in the ocean effect the measurement in a linear predictable way and not in a manner highly contaminated by measurement errors. Temperature, salinity, sound speed and pressure may be measured by conventional state-of-the-art techniques. Depth and sea surface roughness may be measured by an inverted echo sounder. Likewise bottom roughness and geophysical properties may be measured by an echo sounder. Surface wind stress may be directly correlated to ambient sea noise in the 1000 Hz band and can be remotely sensed by the echo sounder's hydrophone. Turbulence/internal wave spectra may be measured inertially or acoustically. The current may be indirectly measured by tracking the system from fixed acoustic receivers capable of azimuthal resolution.

Since the drifting oceanographic sensor system moves through the ocean, the oceanographic parameters change slowly. A sampling period of 30 seconds for each parameter results in a total data rate of 0.23Hz times the bit resolution (approximately 12 bits) - approximately 3Hz. The data is time-compressed into a wider telemetry band so that the relatively high level acoustic telemetry is operated only intermittently. A telemetry band of 200 to 250 Hz minimizes total electrical energy required to convey the data over long acoustic paths up to 500 miles, for an ambient beam noise level of 62 dB and a transmission loss of 105 dB, resulting in a telemetry duty cycle of 3/50 or 3.6 min/hr. Although the telemetry link may be degraded by acoustic multipath transmission, such degradation is tolerable in an experimental framework with some data being lost due to low signal-to-noise at the distant receiver.

For operation the sensor system is deployed from any suitable platform such as surface ship, aircraft or submarine. Prior to launch the buoyancy schedule is pre-programmed according to local and predicted conditions such that the sensor system remains stably at a fixed density contour (isopycnal) in the ocean for each schedule buoyancy stage. This translates very nearly to constant operating depth for each scheduled stage throughout the sensor system's operating regime, normally setable from surface to depths near the sea floor. The data are collected by the sensor(s) 12, processed by the electronics package 16 and stored in the storage/transmit device 20. When the telemetry duty cycle reaches transmit time, the data are read from the storage/transmit device 20 and radiated as acoustic energy by the acoustic telemetry transducer 14 for reception by fixed acoustic receivers. At least two such receivers together provide the triangulation information necessary to plot the position of the sensor system, and by extrapolation the ocean current.

Thus, the present invention provides a drifting oceanographic sensor system which can be left untended after its deployment, and which provides extensive oceanographic environmental data over a larger area than is practical with conventional oceanographic instrumentation packages.

What is claimed is:

1. A drifting oceanographic sensor system comprising:

a variable buoyancy housing;

an oceanographic sensor connected externally to said housing;

means contained internal to said housing for processing and multiplexing the electrical signal from said sensor;

means for acoustically transmitting the data output from said processing and multiplexing means; and means for adjusting the buoyancy of said housing such that said sensor system drifts along a pre-programmed depth schedule.

2. A drifting oceanographic sensor system as recited in claim 1 wherein said acoustically transmitting means comprises:

means for storing said data output from said processing and multiplexing means;

means for modulating an acoustic carrier signal with the data stored in said storing means;

an acoustic transducer driven by said modulating means for transmitting said acoustic carrier modulated by said data from said storing means; and means for transferring said data from said storing means at regular intervals to said modulating means such that said electrical signal from said oceanographic sensor is transmitted as a low duty cycle acoustic telemetry transmission.

* * * * *